United States Patent Office 2,866,812
Patented Dec. 30, 1958

2,866,812

ALKYLATED ESTERS

Earl V. Kirkland, Le Marque, Tex., assignor to The American Oil Company, Texas City, Tex., a corporation of Texas No Drawing. Application October 30, 1956
Serial No. 619,102

4 Claims. (Cl. 260—485)

This invention relates to alkylation products of olefins with dioctyl adipate and in particular it concerns the alkylation products of propylene with dioctyl adipate.

While certain diesters are satisfactory as a base material for synthetic lubricants, other esters are not satisfactory because of their low viscosity and viscosity index. Dioctyl adipate, which is readily available in large quantities at a relatively low cost, would be very widely used because of its relative cheapness if it had a somewhat higher viscosity and a higher viscosity index.

An object of this invention is to provide new compositions of matter which have increased viscosity and increased viscosity indices making them useful as lubricating oil base compositions. Another object is to provide a method for preparing alkylated dioctyl adipates having the defined improved characteristics. A further object of the invention is to provide new compositions of matter useful as lubricating oil base stocks which are prepared from relatively inexpensive dioctyl adipate by alkylation thereof with a specific olefin.

It has been found that when dioctyl adipate is alkylated with propylene using a free radical initiator, alkylation reaction products are obtained which consist of olefin polymers, non-alkylated dioctyl adipate, and alkylated dioctyl adipate. After fractionally distilling those olefin polymers which boil at a temperature lower than dioctyl adipate, a mixture of alkylated and non-alkylated dioctyl adipate is recovered. This mixture may contain between 5 and 90% alkylated dioctyl adipate, with the remainder being non-alkylated dioctyl adipate. This mixture may have an average molecular weight between about 380 and 500. It has a higher kinematic viscosity at 100° F. and also at 210° F. than does the original dioctyl adipate, and it also has a higher viscosity index than does the original dioctyl adipate. The viscosity and viscosity index of such mixtures is sufficiently high so that it passes the military specifications Mil–L–7808B with respect to these two characteristics, whereas the original dioctyl adipate does not meet these specifications. The mixture of alkylated and non-alkylated dioctyl adipate can be further distilled to remove non-alkylated dioctyl adipate, leaving behind the alkylated dioctyl adipate. The alkylated dioctyl adipate, freed of non-alkylated esters, has an even higher viscosity index than does the mixture of alkylated and non-alkylated ester. The alkylated dioctyl adipate (which has been freed of unreacted dioctyl adipate) has an average molecular weight between about 410 and 700. If desired it can be further fractionated into close boiling cuts. In carrying out the reaction between dioctyl adipate and propylene, the reaction is carried out using a free radical initiator, such as between about 0.5 and 15 weight percent of ditertiarybutyl peroxide (based upon dioctyl adipate), under alkylation reaction conditions which may comprise a temperature between about 90° and 250° C. (or even higher or lower temperatures can be used dependent upon the specific free radical initiator employed).

The dioctyl adipate which is alkylated with propylene is preferably an adipic acid ester obtained by esterification with a single isomer of octyl alcohol or a mixture of isomers. Those prepared from branched chain alcohols or mixtures containing them are preferred, although di-n-octyl adipate can be used. Alcohols such as 2-ethylhexanol or alcohols produced in the Oxo or Synthol processes are satisfactorily used in preparing the dioctyl adipate.

The dioctyl adipate is reacted with propylene under alkylation reaction conditions. Surprisingly, it has been found that alkylation of dioctyl adipate with propylene increases the viscosity and also increases the viscosity index, whereas ethylene reduces the viscosity index and isobutylene does not adequately increase the viscosity.

A free radical initiating agent is used in the alkylation of dioctyl adipate with propylene. The various types of free radical initiators such as organic peroxide compounds, various azo compounds, or ultraviolet light can be employed. The conditions of temperature, pressure and reaction time are those which are conventionally employed with the particular initiator used in order to achieve alkylation of at least about 10% of the dioctyl adipate. Usually between about 0.2 to 4.0 mols of propylene per mol of dioctyl adipate are used in the reaction. When using ditertiarybutyl peroxide, which is one of the preferred ditertiary alkyl peroxides, a superatmospheric pressure of between 100 to 1000 p. s. i. g. (due primarily to olefin partial pressure) may be used while employing temperatures of from 90° to 250° C. and reaction times of from 0.5 to 50 hours.

A mixture of products is produced during the alkylation reaction. The total alkylation reaction products contain olefin polymers of various chain length, non-alkylated dioctyl adipate, and dioctyl adipate molecules containing differing numbers of attached propyl radicals. It appears that alkylation of the propylene radical takes place within the alcohol segment of the ester molecule. The total alkylation reaction products are fractionally distilled to remove overhead the olefin polymers which boil at a temperature below that of the dioctyl adipate originally employed. The remaining mixture is primarily composed of alkylated and non-alkylated dioctyl adipate, at least 5% of the mixture being the alkylated dioctyl adipate. This mixture may have an average molecular weight between 380 and 500, usually about 390 to 450.

While it increases cost, the mixture of alkylated and non-alkylated dioctyl adipate can be further fractionated to separate a part or all of the non-alkylated dioctyl adipate. By this means the alkylated dioctyl adipate can be recovered in a relatively pure form. It has a higher viscosity and a higher viscosity index than does the mixture of alkylated and non-alkylated dioctyl adipate. The mixture of various alkylated dioctyl adipates, which has been freed of non-alkylated dioctyl adipate, may have a molecular weight between about 410 and 700. By precise fractionations, the alkylated dioctyl adipate can be cut up to yield almost pure compounds. The relatively pure compounds produced by fractionation can be added to conventional petroleum lubricating oils as viscosity index improvers.

A number of experiments were carried out which demonstrate the unexpected and improved qualities of the products prepared by alkylating dioctyl adipate with propylene. Bis-(2-ethylhexyl) adipate and approximately 4 weight percent of ditertiarybutyl peroxide (based upon the ester) were mixed in a glass lined reactor. The bomb reactor was flushed with nitrogen, heated to about 130–135° C. and olefin was introduced until a pressure of 300–500 p. s. i. g. (it varied in the different runs) was reached. The above procedure was used when the olefin was ethylene; but when the olefin was propylene or isobutylene, the olefin was introduced into the rocking bomb before the bomb was heated. The bomb was rocked for several hours until the pressure had dropped approximately 100 p. s. i. g. and then additional olefin was added to maintain the pressure reading. Reaction times of 19–24 hours were employed. At the conclusion of the experiment, the bomb was depressured releasing the olefin present. The liquid products were then distilled up to about the boiling point of bis-(2-ethylhexyl) adipate to remove olefin polymers overhead. The remaining mixture of alkylated and non-alkylated dioctyl adipate was nearly colorless. To determine the amount of dioctyl adipate which had been alkylated, the mixture was distilled through a Vigreux column up to about 195–200° C. at 1 mm. Hg to remove non-alkylated esters overhead. The quality of the mixtures of alkylated and non-alkylated dioctyl adipate as lubricating oil base materials was determined to see whether it would pass military specification Mil-L-7808B. The results are shown in Table I which follows:

Table I

| Experiment | Gov't. Spec. Mil-L-7808B | 1 | 2 | 3 | 4 |
|---|---|---|---|---|---|
| Ester | | ¹DOA | DOA | DOA | DOA |
| Olefin | | | ethene | propene | isobutene |
| Percent of Ester Alkylated | | | 15 | 18 | 11 |
| Product: | | | | | |
| Kin. Vis. at 100° F | | 11 | 8.0 | 11.2 | 15.1 | 9.9 |
| Kin. Vis. at 210° F | | 3 | 2.4 | 2.9 | 3.7 | 2.8 |
| Viscosity Index | | 146 | 131 | 120 | 155 | 146 |
| Pour Point, °F | | −65 | −80 | −80 | −70 | −70 |
| Flash Point, °F | | 350 | 425 | 420 | 435 | 430 |

¹ DOA—abbreviation for bis-(2-ethylhexyl) adipate.

The above results show that alkylation with propylene is unique in that it increases both the viscosity and the viscosity index of the dioctyl adipate to a level where it passes the Mil-L-7808B specifications in these respects. When ethylene was used as the alkylating olefin, there was some improvement in viscosity of the ester but the viscosity index of the ester was decreased to a figure even lower than the original dioctyl adipate (which itself was deficient in viscosity index). The use of isobutylene as the alkylating olefin enables a slight improvement in viscosity and viscosity index, but the improvement is insufficient to enable the alkylation products to pass the Mil-L-7808B specifications in these respects.

Thus having described the invention what is claimed is:

1. A mixture of olefin-dioctyl adipate alkylation products which is prepared by reacting propylene with dioctyl adipate under alkylation reaction conditions in the presence of a free radical initiating agent whereupon alkylation reaction products comprising alkylated and non-alkylated dioctyl adipate and olefins polymers are produced, fractionally distilling said alkylation reaction products to remove olefin polymers which are lower boiling than dioctyl adipate and recovering a mixture of alkylated and non-alkylated dioctyl adipate containing at least 5% of the alkylated dioctyl adipate, said recovered mixture having an average molecular weight between about 380 and 500 and having a higher kinematic viscosity and a higher viscosity index than the original dioctyl adipate.

2. The composition of claim 1 in which the dioctyl adipate is bis-(2-ethylhexyl) adipate.

3. A process for preparing an improved lubricating oil base composition which comprises reacting dioctyl adipate with propylene in the presence of between about 0.5 and 15 weight percent of ditertiarybutyl peroxide based upon dioctyl adipate under alkylation reaction conditions comprising a temperature between about 90° and 250° C. whereby at least 5% of the dioctyl adipate is alkylated with propylene and alkylation reaction products are formed, fractionally distilling said alkylation reaction products to remove therefrom olefin polymers which are lower boiling than dioctyl adipate, and recovering a mixture of alkylated and non-alkylated dioctyl adipate which mixture has an average molecular weight between about 380 and 500 and a higher kinematic viscosity and a higher viscosity index than the original dioctyl adipate.

4. A mixture of olefin-dioctyl adipate alkylation products which is prepared by reacting propylene with dioctyl adipate under alkylation reaction conditions in the presence of a free radical initiating agent whereupon alkylation reaction products comprising alkylated and non-alkylated dioctyl adipate and olefins polymers are produced, fractionally distilling said alkylation reaction products to remove non-alkylated dioctyl adipate and olefin polymers which are lower boiling than the alkylated dioctyl adipate, and recovering a mixture of alkylated dioctyl adipates having an average molecular weight between about 410 and 700.

References Cited in the file of this patent
UNITED STATES PATENTS

| 2,402,137 | Hanford et al. | June 18, 1946 |
| 2,499,848 | Catlin et al. | Mar. 7, 1950 |
| 2,548,493 | Robey | Apr. 10, 1951 |
| 2,561,232 | Rudel et al. | July 17, 1951 |
| 2,692,233 | Cottle et al. | Oct. 19, 1954 |

OTHER REFERENCES

Bried et al.: Ind. Eng. Chem. 39 (1947), pp. 484–91.